W. D. LEE.
HORSE HITCHING WEIGHT.
APPLICATION FILED JULY 14, 1911.
1,024,406.
Patented Apr. 23, 1912.
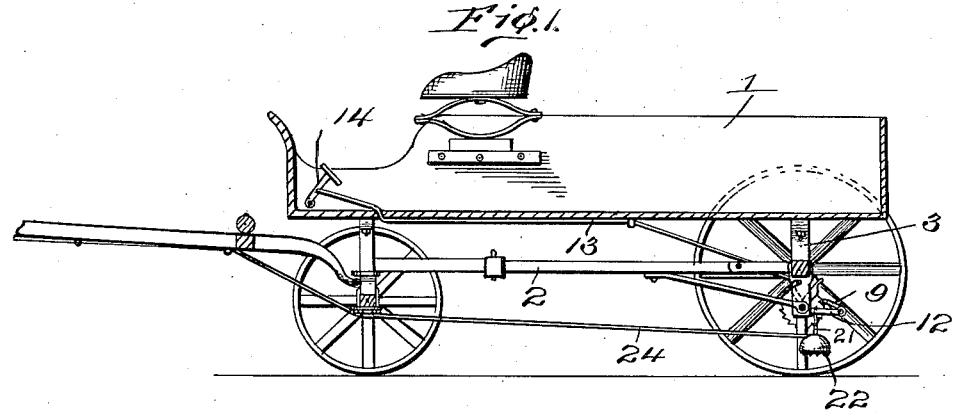
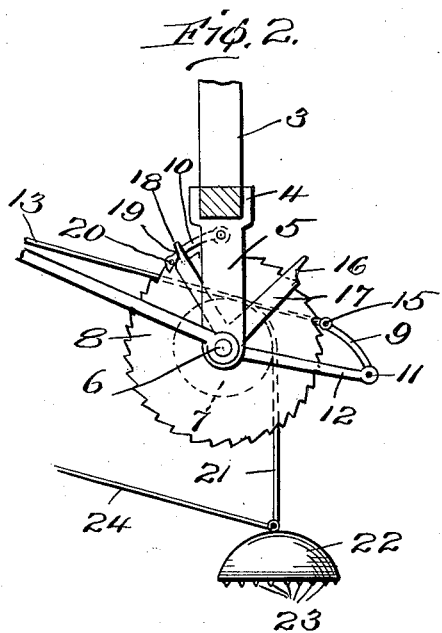
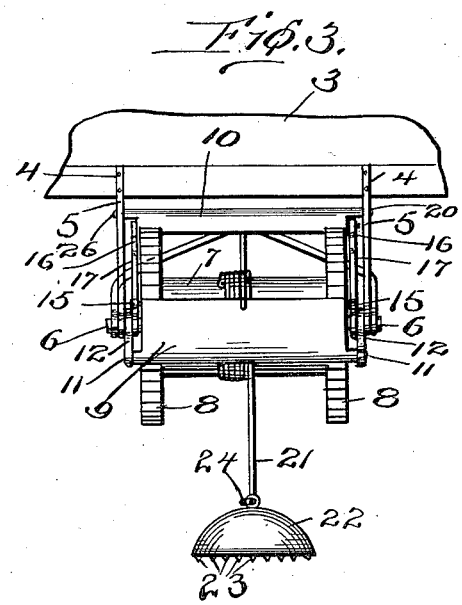
Witnesses
Inventor
William D. Lee,
By Mason Fenwick Lawrence,
Attorneys

UNITED STATES PATENT OFFICE.

WILLIAM D. LEE, OF DENVER, COLORADO, ASSIGNOR OF ONE-HALF TO GEORGE G. EWELL, OF PHILLIPS COUNTY, KANSAS.

HORSE-HITCHING WEIGHT.

1,024,406.  Specification of Letters Patent. Patented Apr. 23, 1912.

Application filed July 14, 1911. Serial No. 638,535.

*To all whom it may concern:*

Be it known that I, WILLIAM D. LEE, a citizen of the United States, residing at Denver, in the county of Denver and State of Colorado, have invented certain new and useful Improvements in Horse-Hitching Weights; and I do hereby declare the following to be a full, clear, and exact description of the invention, such as will enable others skilled in the art to which it appertains to make and use the same.

This invention relates to improvements in horse hitching weights, and particularly to a weight designed to be dropped at any time from its normal support and caused to act as a hitching weight or stop when so dropped.

The object in view is the arrangement of a weight suspended from a vehicle and connected with the draft animals of the vehicle, associated with means for raising and releasing the weight whenever desired so that the weight may be caused to act against the draft animals or not as desired.

A further object of the invention is the arrangement in a drop weight horse hitch, of a weight connected with the draft animals of a vehicle, associated with a winding drum and means operable by the driver for raising the weight from the ground or releasing the same whenever desired.

With these and other objects in view the invention comprises certain novel constructions, combinations, and arrangement of parts as will be hereinafter more fully described and claimed.

In the accompanying drawings: Figure 1 is a side view of a wagon with an embodiment of the invention applied thereto. Fig. 2 is an enlarged side view of the invention. Fig. 3 is a rear view of the structure shown in Fig. 2.

Referring to the accompanying drawings by numerals, 1 indicates the vehicle body, 2 the running gear, and 3 the rear axle. Connected with the rear axle 3 is a supporting bracket 4 which has arms 5 extending down for accommodating shaft 6. Rotatably mounted on shaft 6 is a drum 7 formed substantially spool shaped with ratchet members 8 arranged at each end, which ratchet members are engaged by pawls 9 and 10. Pawl 9 is pivotally mounted at 11 to an arm 12 which in turn is pivotally mounted on shaft 6. This allows the free movement of arm 12 as well as pawl 9 so that the pawl 9 may operate properly when moved by the cable 13. Cable 13 passes through suitable eyelets connected with any desired part of the vehicle, and extends forward to a lever 14 operated by the driver. Pawl 9 is provided with lugs or wheels 15 which lugs or wheels extend beyond the respective ratchet members 8 and engage the beveled part 16 of arms 17. Arms 17 are rigidly connected with arms 18 but are pivotally mounted on shaft 6. When the lugs or wheels 15 strike the beveled portion 16 and pawl 9 is caused to continue in its upward movement the lugs or wheels 15 will push arms 17, and consequently move arms 18 forward. Arms 18 are moved with cam portions 19 which engage lugs or extensions 20 connected with pawl 10. If the movement of the arms 18 is sufficient the same will cause pawl 10 to be disengaged from the ratchet members 8, beveled portions 16 having previously caused the release of pawl 9.

Drum 7 has connected therewith a cable 21 to which a weight 22 is secured. Weight 22 may be of any desired size, and if desired may be formed with spurs or projections 23. Weight 22 is connected with the bridle of the draft animals by cable 24 which cable may pass through suitable eyelets or other guiding means for preventing the same from getting tangled or being caught in any of the operating parts of the vehicle.

From the structure described it will be noted that upon a forward movement of lever 14 pawl 9 will engage the ratchet members 8 and move the same forward. If the movement of pawl 9 is not sufficient for causing the lugs or wheels 15 to engage arms 17 the result will be that cable 21 will be wound on drum 7 and pawl 10 will prevent a reverse movement. Upon releasing lever 14 pawl 9 will automatically make a return movement and lever 14 then may be again operated. The continued operation of lever 14 in this manner will cause the winding of cable 21 and the elevation of weight 22. When it is desired to drop weight 22 lever 14 is pressed forward to its extreme position which will cause the lugs or wheels 15 on pawl 9 to engage arms 17 and move the same forward, which movement will cause arms 18 to engage and move pawl 10 out of engagement with the ratchet members 8. As soon as both of the pawls have been disengaged from ratchet members 8 weight 22 will naturally drop by gravity and unwind cable 21. If the vehicle is moving this will cause the weight 22 to be thrown on the bridle, and if the vehicle is stationary it will act in the manner of an ordinary weight.

What I claim is:

1. In a device of the character described, the combination with a vehicle, of a bracket connected therewith, a drum rotatably mounted on said bracket, ratchet members connected with said drum, a pawl for rotating said drum in one direction, a second pawl for preventing a reverse rotation of said drum, means for moving said first mentioned pawl, a cable for said drum, a weight connected with said cable, means operable by said first mentioned pawl for releasing both of said pawls in order to permit said weight to drop by gravity and unwind said drum, and a hitching cable connected with said weight.

2. In a device of the character described, the combination with a vehicle, of a hitching cable, a weight connected therewith, a lifting cable connected with the weight, a drum for winding the lifting cable, a ratchet wheel connected with said drum for rotating the same, a pawl for rotating said ratchet wheel, means for operating said pawl, a second pawl for preventing the rotation of said ratchet wheel, and a pair of pawl shifting arms adapted to engage both of said pawls for raising the same from said ratchet wheel when said first mentioned pawl has been moved to its extreme forward position, whereby said ratchet wheel and drum are permitted to rotate in a reverse direction and said weight is permitted to fall by gravity.

3. In a device of the character described, the combination with a vehicle, of a hitching cable, a weight connected therewith, a lifting cable connected with said weight, a drum connected with said lifting cable for winding the same and raising said weight, means connected with said vehicle for supporting said drum, a ratchet wheel rigidly connected with said drum, a pawl engaging said ratchet wheel, means for moving said pawl for causing the same to rotate said ratchet wheel, a second pawl engaging said ratchet wheel for preventing a reverse movement thereof, and a pair of pawl disengaging arms formed with cam surfaces adapted to engage said pawls and move the pawls out of engagement with said ratchet wheel upon an extreme forward movement of said first mentioned pawl, whereby said ratchet wheel is released and said weight may drop under the action of gravity.

4. In a device of the character described, the combination with a vehicle, of a hitching cable, a weight connected therewith, a lifting cable connected with the weight, a drum supported by said vehicle and engaging said lifting cable, oscillating means for rotating said drum for winding said lifting cable, and means operated by said oscillating means when moved to an extreme position in one direction for releasing said drum and permitting said weight to drop to the ground.

In testimony whereof I affix my signature in presence of two witnesses.

WILLIAM D. LEE.

Witnesses:
 CARLE WHITEHEAD,
 ALBERT L. VOGL.

---

Copies of this patent may be obtained for five cents each, by addressing the "Commissioner of Patents, Washington, D. C."